(12) United States Patent
Hayami et al.

(10) Patent No.: US 11,208,031 B2
(45) Date of Patent: Dec. 28, 2021

(54) CONTROL DEVICE FOR A VEHICLE LAMP AND LIGHT DISTRIBUTION CONTROL SYSTEM

(71) Applicant: KOITO MANUFACTURING CO., LTD., Tokyo (JP)

(72) Inventors: Toshihisa Hayami, Shizuoka (JP); Kazuhiro Suzuki, Shizuoka (JP); Yusuke Funami, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 139 days.

(21) Appl. No.: 16/608,437

(22) PCT Filed: Apr. 4, 2018

(86) PCT No.: PCT/JP2018/014467
§ 371 (c)(1),
(2) Date: Oct. 25, 2019

(87) PCT Pub. No.: WO2018/198699
PCT Pub. Date: Nov. 1, 2018

(65) Prior Publication Data
US 2020/0047662 A1    Feb. 13, 2020

(30) Foreign Application Priority Data

Apr. 27, 2017 (JP) .............................. JP2017-088393

(51) Int. Cl.
*B60Q 1/12* (2006.01)
*F21S 41/657* (2018.01)
*B60Q 1/076* (2006.01)

(52) U.S. Cl.
CPC ............. *B60Q 1/122* (2013.01); *B60Q 1/076* (2013.01); *F21S 41/657* (2018.01)

(58) Field of Classification Search
CPC ........ B60Q 1/076; B60Q 1/122; F21S 41/657
See application file for complete search history.

(56) References Cited

U.S. PATENT DOCUMENTS 5,802,266 A    9/1998   Kanekawa et al.
2004/0090788 A1 5/2004   Ishida
(Continued)

FOREIGN PATENT DOCUMENTS

EP    0735381 A2    10/1996
JP    H05114257 A    5/1993
(Continued)

OTHER PUBLICATIONS

P. B. McGee et al., "A Level-Encoded Transition Signaling Protocol for High-Throughput Asynchronous Global Communication", Asynchronous Circuits and Systems, 2008. ASYNC'08. 14TH IEEE International Symposium on, IEEE, Piscataway, NJ, USA, Apr. 7, 2008, pp. 116-127 (12 pages).
(Continued)

*Primary Examiner* — Robert J May
(74) *Attorney, Agent, or Firm* — Osha Bergman Watanabe & Burton LLP

(57) ABSTRACT

A control device that includes a plurality of input ports, each of which receives a binary signal including a first level and a second level, and a setting unit, which sets a numerical value related to control based on the binary signal input to each of the input ports, is disclosed. The input port is configured to be at the second level when a failure occurs, and the setting unit associates different binary signal arrays with a plurality of the numerical values, respectively, and sets a binary signal array corresponding to a numerical value equivalent to a reference value among the plurality of numerical values as an array in which the number of the second level is the largest.

4 Claims, 9 Drawing Sheets

(56) References Cited

U.S. PATENT DOCUMENTS

2014/0307456 A1  10/2014  Ishida et al.
2015/0184820 A1  7/2015  Lee et al.

FOREIGN PATENT DOCUMENTS

| JP | H06244828 A | 9/1994 |
| JP | 2004155233 A | 6/2004 |
| JP | 2014205400 A | 10/2014 |
| JP | 2017013737 A | 1/2017 |

OTHER PUBLICATIONS

Extended European Search Report issued in European Application No. 18790033.7, dated Dec. 4, 2020 (11 pages).
International Search Report issued in International Application No. PCT/JP2018/014467, dated Jun. 26, 2018 (4 pages).
Written Opinion issued in International Application No. PCT/JP2018/014467; dated Jun. 26, 2018 (3 pages).

FIG. 7

| SETTING CONTENT | S/L SWITCHING | | 1/2 SWITCHING | | R/L SWITCHING | |
|---|---|---|---|---|---|---|
| INPUT PORT | Ps5 | Ps4 | Ps3 | Ps2 | Ps1 | Ps0 |
| SCB1(R) | H | L | L | H | H | L |
| SCB1(L) | H | L | L | H | L | H |
| SCB2(R) | H | L | H | L | H | L |
| SCB2(L) | H | L | H | L | L | H |
| LCB2(R) | L | H | H | L | H | L |
| LCB2(L) | L | H | H | L | L | H |
| LCB1(R) | L | H | L | H | H | L |
| LCB1(L) | L | H | L | H | L | H |
| STOP | OTHER THAN ABOVE | | | | | |

FIG. 8

| BACKLASH CORRECTION VALUE | Pa3 | Pa2 | Pa1 | Pa0 |
|---|---|---|---|---|
| 2 | L | H | H | H |
| 3 | L | H | L | L |
| 4 | L | L | L | H |
| 5 (REFERENCE VALUE) | L | L | L | L |
| 6 | L | L | H | L |
| 7 | H | L | L | L |
| 8 | H | L | H | L |
| 9 | H | H | H | H |
| 5 | OTHER THAN ABOVE | | | |

FIG. 9

| BACKLASH CORRECTION VALUE | Pa3 | Pa2 | Pa1 | Pa0 |
|---|---|---|---|---|
| 0 | L | L | L | L |
| 1 | L | L | L | H |
| 2 | L | L | H | L |
| 3 | L | L | H | H |
| 4 | L | H | L | L |
| 5 (REFERENCE VALUE) | L | H | L | H |
| 6 | L | H | H | L |
| 7 | H | H | H | H |
| 8 | H | L | L | L |
| 9 | H | L | L | H |
| 10 | H | L | H | L |
| 11 | H | L | H | H |
| 12 | H | H | L | L |
| 13 | H | H | L | H |
| 14 | H | H | H | L |
| 15 | H | H | H | H |

CONTROL DEVICE FOR A VEHICLE LAMP AND LIGHT DISTRIBUTION CONTROL SYSTEM

TECHNICAL FIELD

The present invention relates to a control device for controlling a vehicle lamp, and more particularly to a control device and a light distribution control system suitable for use in lamp light distribution control.

BACKGROUND

In order to ensure appropriate light distribution according to changes in a situation of an automobile, a head lamp of the automobile is provided with a leveling actuator (hereinafter abbreviated as LA) which changes and controls a light irradiation optical axis of the head lamp in a vertical direction according to a change in pitch angle of the automobile (a tilt angle of a front portion of the automobile with respect to a road surface in the vertical direction), or a swivel actuator (hereinafter abbreviated as SA) which changes the light irradiation optical axis of the head lamp in a horizontal direction according to a change in steering angle of the automobile (an angle in a left-right direction with respect to a straight direction of the automobile). Patent Literature 1 proposes a head lamp provided with a leveling and swivel actuator (hereinafter abbreviated as LSA) in which LA and SA are integrated.

CITATION LIST

Patent Literature

Patent Literature 1: JP-A-2017-13737

SUMMARY

Depending on a specification of the head lamp, any one of the LA, SA and LSA actuators can be selected and equipped. However, since these actuators have different configurations from each other in mechanism units including a built-in motor, a dedicated control device for controlling the motor is necessarily required. Therefore, it is preferable to equip a dedicated control device corresponding to each actuator, for example, a custom IC (integrated circuit) designed to perform dedicated control. However, in order to cope with the LA, SA, and LSA, at least three different types of custom ICs are required, which is complicated in terms of manufacture and management, and leads to a high cost.

A configuration is also conceivable in which each actuator is controlled by a program using a general-purpose IC, but an IC provided with a memory for storing the program is expensive, and the work of writing the program into respective ICs is complicated. In addition, when the control over the actuator is to be corrected or changed, the program must be changed and maintenance is complicated.

Further, it is also conceivable to perform control by inputting a setting signal and a control signal from the outside to a general-purpose IC, but it is difficult to ensure normal control or high precision control when a failure occurs in an input system of these signals.

Embodiments of the present invention provide a lamp light distribution control system which enables light distribution control by different actuators with control devices having the same configuration, particularly ICs having the same configuration, and is inexpensive and easy for maintain. In addition, embodiments provide a control device capable of preventing an abnormality or a precision decrease of the light distribution control when a failure occurs.

A control device in accordance with embodiments disclosed herein include: a plurality of input ports, each of which receives a binary signal including a first level and a second level; and a setting unit, which sets a numerical value related to control based on the binary signal input to each of the input ports, in which the input port is configured to be at the second level when a failure occurs, and the setting unit associates different binary signal arrays with a plurality of the numerical values, respectively, and sets a binary signal array corresponding to a numerical value equivalent to a reference value among the plurality of numerical values as an array in which the number of the second level is the largest.

In one or more embodiments of the control device, a binary signal array corresponding to a numerical value close to the reference value is provided by reducing one binary signal in a second level. In addition, in one or more embodiments of the control device, the input port is configured with a pull-down circuit, the first level is an "H" level, and the second level is an "L" level.

A lamp light distribution control system of the present invention includes a control device configured to perform swivel control and/or leveling control over a vehicle lamp, in which the control device is the control device according to the present invention, and the numerical value set in the control device is a correction value when controlling rotation of a motor which performs the swivel control and/or the leveling control.

According to embodiments of the present invention, even when a failure occurs in the input port of the control device and the input port opens, and the signal input to the input port is recognized incorrectly, the numerical value set based on the signal can be prevented from being greatly changed from the reference value or the original numerical value. By constructing the lamp light distribution control system using the control device of the present disclosure, the abnormality and the precision decrease of the light distribution control can be prevented.

BRIEF DESCRIPTION OF DRAWINGS

FIG. 7 a setting table of a control circuit according in accordance with one or more embodiments disclosed herein.

FIG. 8 a setting table of a backlash correction value in accordance with one or more embodiments disclosed herein.

FIG. 9 a setting table of a general backlash correction value as a reference example in accordance with one or more embodiments disclosed herein.

DETAILED DESCRIPTION

Figure 1:
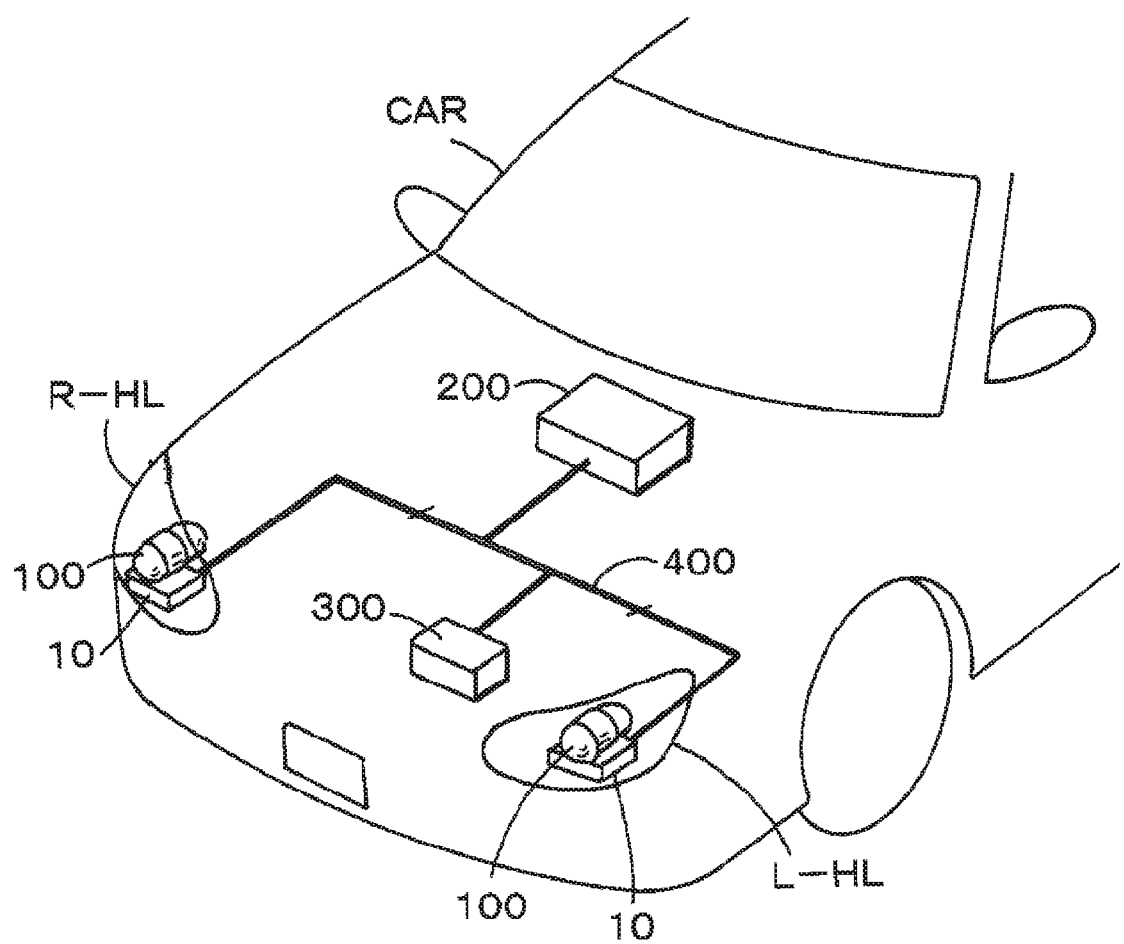
FIG. 1 a conceptual diagram of a light distribution control system in accordance with one or more embodiments disclosed herein.

Next, an embodiment of the present invention will be described with reference to the drawings. FIG. 1 is a conceptual configuration diagram of an embodiment in which the present invention is applied to left and right head lamps L-HL and R-HL of an automobile CAR. A lamp unit (hereinafter referred to as an LU) 100 is disposed in each of the head lamps L-HL and R-HL. In addition, each LU 100 is provided with an actuator 10, and swivel control and/or leveling control over the LU 100 is enabled by driving the actuator 10.

The actuators 10 of the head lamps L-HL and R-HL are electrically connected to an in-vehicle battery (hereinafter, BAT) 300, and are connected to a vehicle electronic control unit (hereinafter referred to as a vehicle ECU) 200 which centrally controls each part of the vehicle via a LIN (Local Interconnect Network) 400. The actuators 10 of the head lamps L-HL and R-HL are driven by a control signal output from the vehicle ECU 200, so as to perform swivel control and leveling control over the LU 100. Here, one of an SA 10A, an LA 10B, and an LSA 10C to be described later is selected as these actuators 10.

Figure 2A:
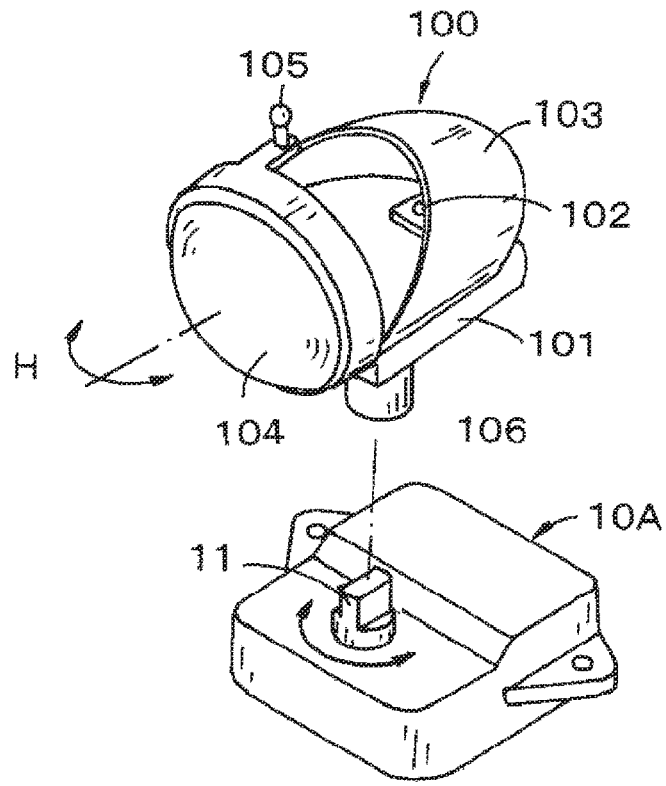
FIG. 2A a conceptual configuration diagram of an SA (swivel actuator) in accordance with one or more embodiments disclosed herein.

FIG. 2A shows a conceptual configuration of the SA 10A. A configuration example is shown in which the lamp unit 100 to be subjected to the swivel control has an LED (light emitting diode) 102 mounted on a base 101, light emitted from the LED 102 is reflected by a reflector 103, and a projection lens 104 emits the light to the front of the vehicle. A ball shaft 105 serving as a tilting fulcrum is vertically provided on an upper side of the LU 100, and a connecting shaft 106 connected to the SA 10A is provided on a lower side of the LU 100.

The SA 10A is disposed below the LU 100, and an output shaft 11 directed upward is connected to the connecting shaft 106 of the LU 100. When the SA 10A is driven, the output shaft 11 is rotated to integrally rotate the connecting shaft 106, and the LU 100 rotates (tilts) in a horizontal H direction, so that swivel control over an LU optical axis is performed.

Figure 3A:
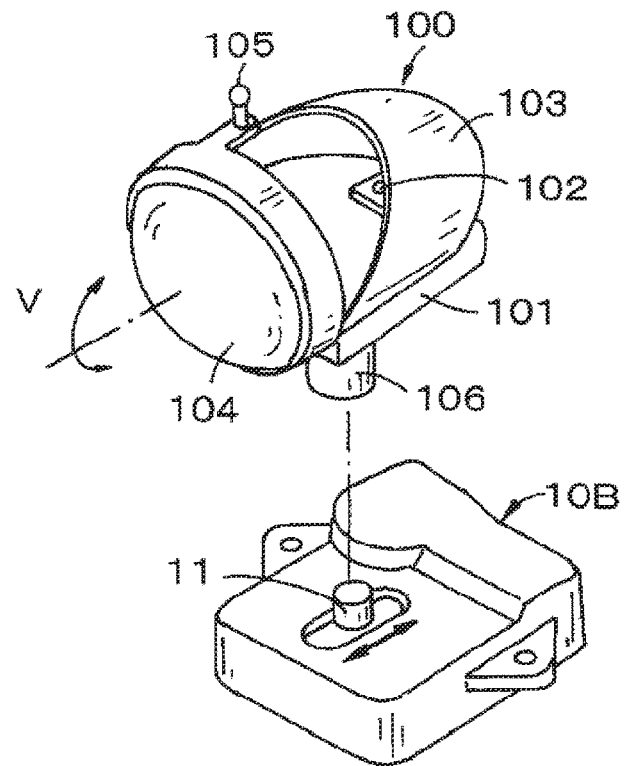
FIG. 3A a conceptual configuration diagram of an LA (leveling actuator) in accordance with one or more embodiments disclosed herein.

FIG. 3A shows a conceptual configuration of the LA 10B. The LU 100 is the same, and the output shaft 11 of the LA 10B is connected to the connecting shaft 106 of the LU 100. When the LA 10B is driven, the output shaft 11 is linearly moved in a front-rear direction of the lamp, and the LU 100 rotates (tilts) in a vertical V direction with the ball shaft 105 as a fulcrum, so that leveling control over the LU optical axis is performed.

Figure 4A:
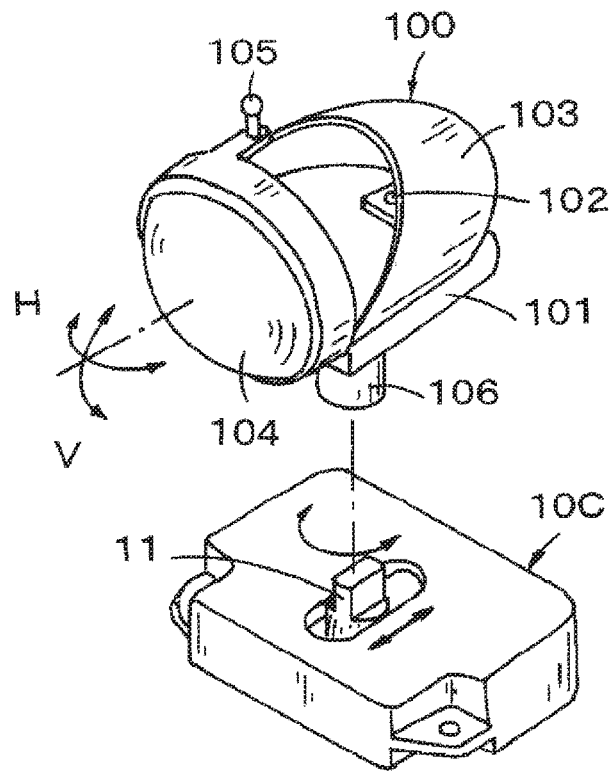
FIG. 4A a conceptual configuration diagram of an LSA (leveling and swivel actuator) in accordance with one or more embodiments disclosed herein.

FIG. 4A shows a conceptual configuration of the LSA 10C. The LU 100 is the same, and the output shaft 11 of the LSA 10C is connected to the connecting shaft 106 of the LU. When the LSA 10C is driven, the output shaft 11 is rotated and linearly driven in the front-rear direction of the lamp.

Accordingly, when the output shaft 11 is rotated, the LU 100 rotates in the horizontal H direction, so that swivel control over the LU optical axis is performed. In addition, when the output shaft 11 is linearly moved, the LU 100 rotates (tilts) in the vertical V direction with the ball shaft 105 as a fulcrum, so that the leveling control over the LU optical axis is performed.

In the present embodiment, in these SA 10A, LA 10B, and LSA 10C, the same custom IC is installed in each casing, and the custom IC controls the built-in motor to drive each output shaft.

Figure 2B:
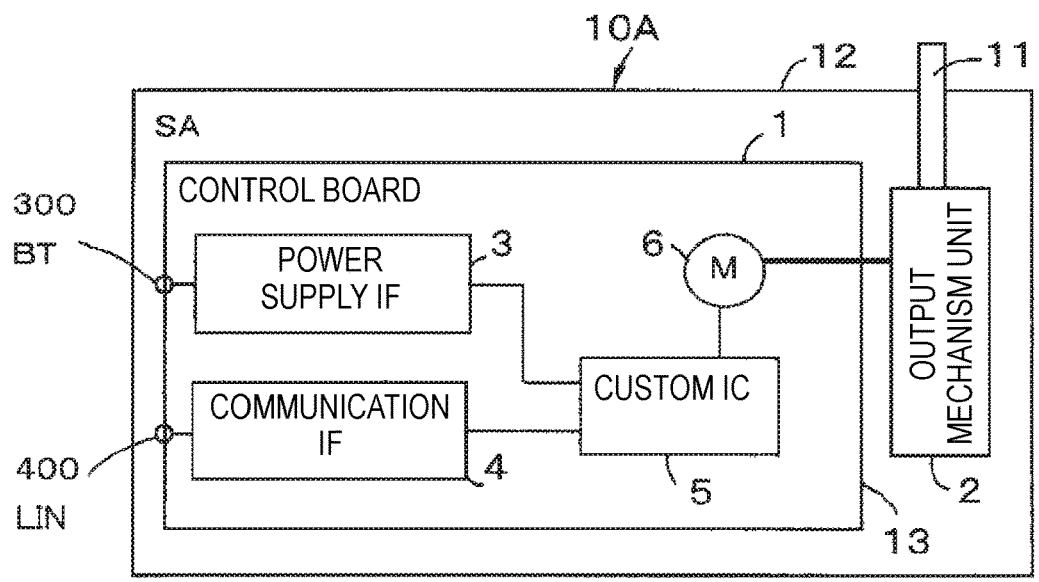
FIG. 2B an internal configuration diagram of the SA (swivel actuator) in accordance with one or more embodiments disclosed herein.

FIG. 2B is a block diagram showing an internal configuration of the SA 10A, in which a control unit 1 and an output mechanism unit 2 are installed in a casing 12. The control unit 1 includes a power supply IF unit 3, a communication IF unit 4, a custom IC 5, and a motor 6. When the motor 6 is driven in the control unit 1, the output shaft 11 is rotationally driven by the output mechanism unit 2 connected to the motor 6.

Figure 3B:
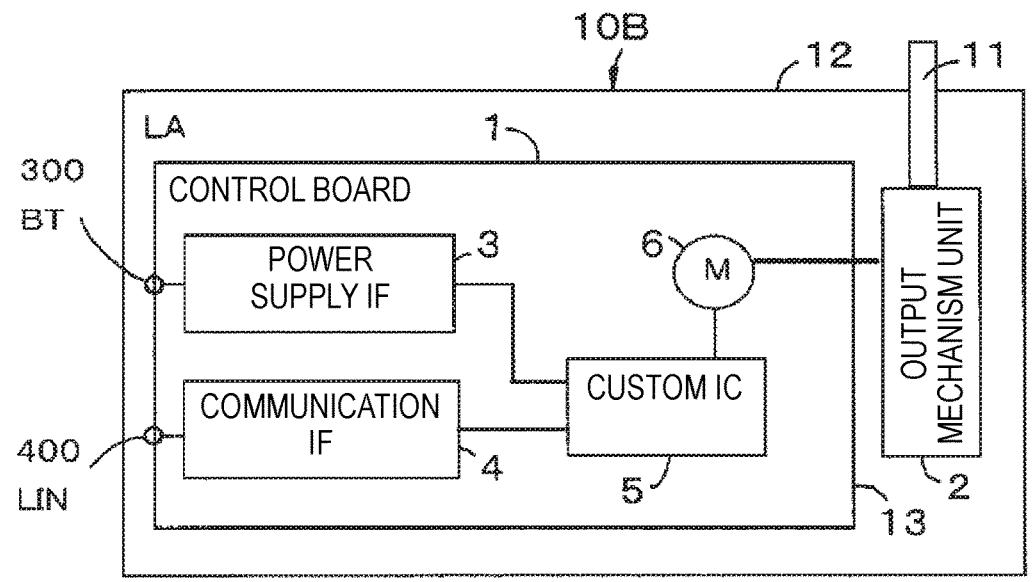
FIG. 3B an internal configuration diagram of the LA (leveling actuator) in accordance with one or more embodiments disclosed herein.

FIG. 3B is a block diagram showing an internal configuration of the LA 10B, in which portions equivalent to those in the SA 10A are denoted with the same reference numerals. The control unit 1 and the output mechanism unit 2 are installed in the casing 12. The control unit 1 includes a power supply IF unit 3, a communication IF unit 4, a custom IC 5, and a motor 6. When the motor 6 is driven in the control unit 1, the output shaft 11 is linearly moved by the output mechanism unit 2 connected to the motor 6.

Figure 4B:
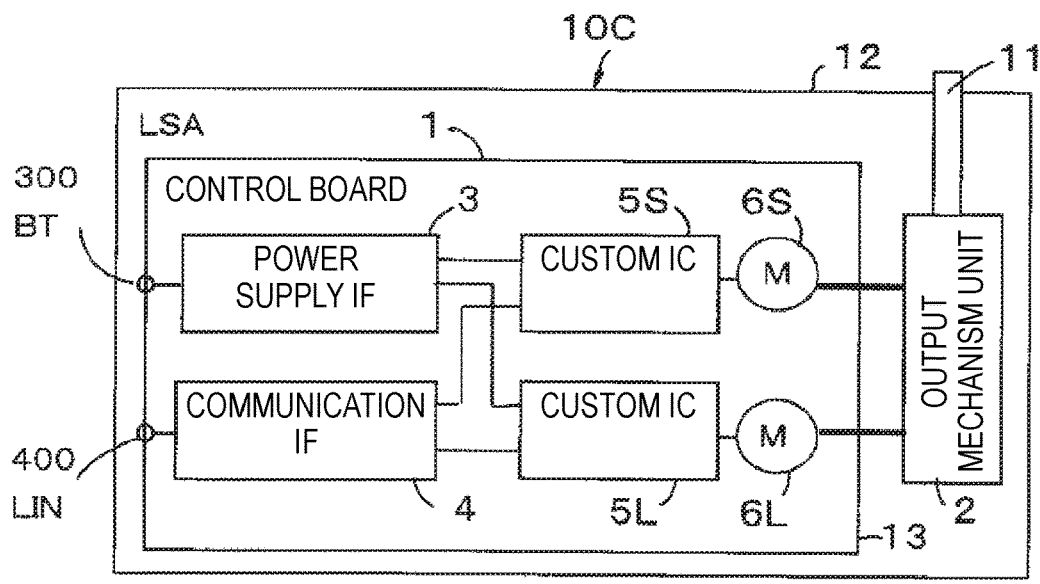
FIG. 4B an internal configuration diagram of the LSA (leveling and swivel actuator) in accordance with one or more embodiments disclosed herein.

FIG. 4B shows an internal configuration of the LSA 10C, in which portions equivalent to those in the SA 10A and the LA 10B are denoted with the same reference numerals. The control unit 1 and the output mechanism unit 2 are installed in the casing 12. The control unit 1 includes the power supply IF unit 3, the communication IF unit 4, two custom ICs 5 (5S, 5L), and two motors 6 (6S, 6L). The custom IC 5S is configured as a custom IC for swivel control, and the custom IC 5L is configured as a custom IC for leveling control. Similarly, a motor 6S is configured as a motor for swivel control, and a motor 6L is configured as a motor for leveling control. When the two motors 6S and 6L are driven in the control unit 1, the output shaft 11 is rotationally driven and linearly moved by the output mechanism unit 2 connected to the motors 6S and 6L.

The control unit 1 of each actuator is connected to the BAT 300 shown in FIG. 1 and is supplied with power. In addition, the control unit 1 of each actuator is connected to the vehicle ECU 200 via the LIN 400, and a setting signal and a control signal are input from the vehicle ECU 200 via the LIN 400. The control unit 1 drives and controls the motor 6 by the custom IC 5 based on the setting signal and the control signal, and performs swiveling control and leveling control over the LU 100.

Figure 5:
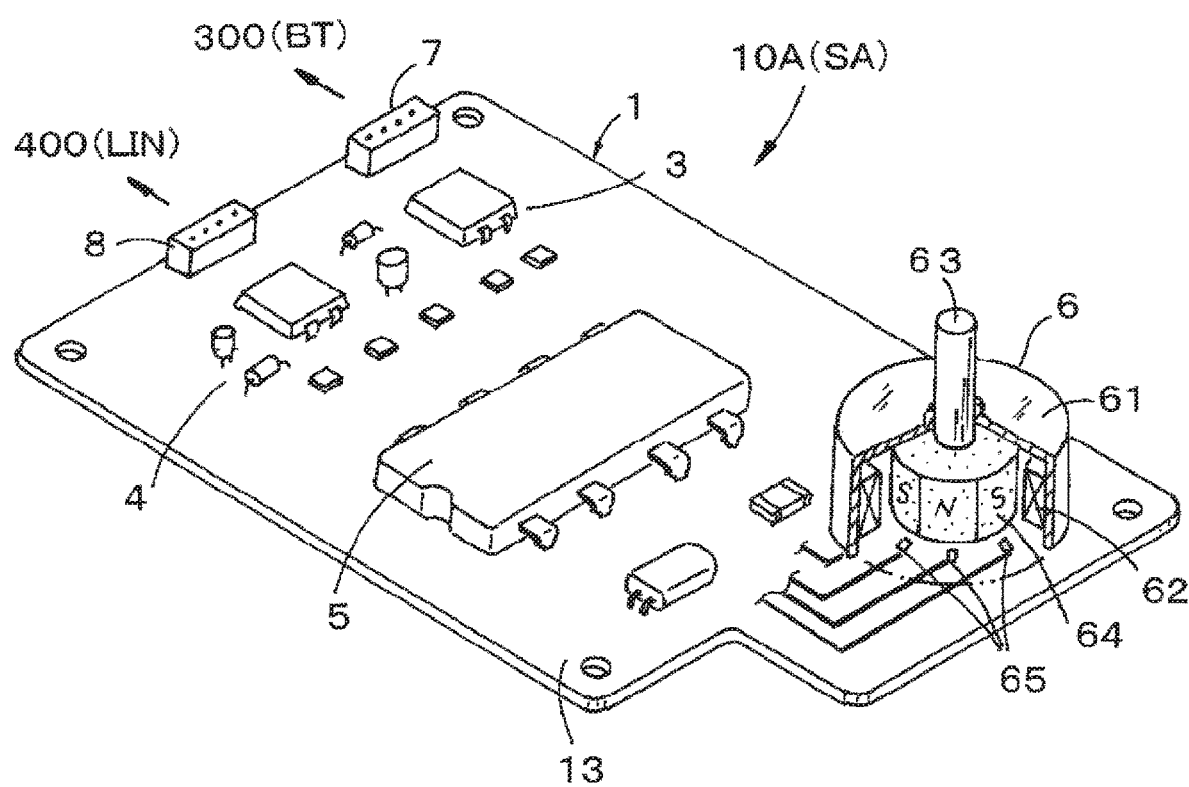
FIG. 5 an appearance diagram showing a schematic configuration of a control unit in accordance with one or more embodiments disclosed herein.

As described above, since the basic configurations of the SA 10A, the LA 10B, and the LAS 10C are substantially the same, these configurations will be described taking the SA 10A as an example. As shown in the schematic configuration of the control unit 1 in FIG. 5, the control unit 1 is constructed on one control board 13. Various electronic components are mounted on the control board 13, and the power supply IF unit 3 and the communication IF unit 4 described above are configured with these electronic components. In addition, the custom IC 5 is mounted on the control board 13 and the motor 6 is integrally incorporated.

The power supply IF unit 3 is connected to a power supply line connected to the BAT 300 via a power supply connector 7. The power supply IF unit 3 converts the power supplied from the BAT 300 into a predetermined voltage and current, and functions as a power supply for driving the control unit 1. In addition, the power supply IF unit 3 also functions as a filter for removing noise superimposed on the connected power supply line.

The communication IF unit 4 is connected to the LIN 400 via a signal connector 8 and inputs the setting signal and the control signal transmitted from the vehicle ECU 200 to the custom IC 5, so as to perform control by the custom IC 5. The communication IF unit 4 is configured to decode the setting signal and the control signal and input the decoded signal to the custom IC 5, but another method may be adopted. In addition, the communication IF unit 4 also functions as a filter for removing noise superimposed on the connected LIN 400.

The motor 6 is configured with a brushless motor integrated with the control board 13. This brushless motor includes a stator 62 including a drive coil installed in a cylindrical container-like motor case 61 attached to the control board 13 and a rotor 64 including a magnet (permanent magnet) integrally provided on a rotation shaft 63 axially supported by the motor case 61, as shown by partially broken the brushless motor.

The motor 6 is rotationally driven at a required number of rotations and rotation speed by inputting a drive current from the custom IC 5 to each drive coil as the stator 62. A hole IC (magnetic detection IC) 65 for detecting the rotation of the rotor 64 is mounted on the motor 6 at a position facing the rotor 64 of the control board 13. By inputting rotation information of the rotation of the rotor 64 detected by the hole IC 65, that is, the rotation amount and the rotation speed of the rotation shaft 63, to the custom IC 5, feedback control can be performed on the number of rotations and the rotation speed of the motor 6.

The output mechanism unit 2 connected to the rotation shaft 63 of the motor 6 is configured with a gear train (not shown), a screw mechanism (not shown) or the like, and is configured to change, particularly to decelerate a rotation output of the motor 6, so as to rotationally drive the output shaft 11. The motor 6 can perform forward rotation and reverse rotation, so that the output shaft 11 can subjected to forward drive and reverse drive. Accordingly, the swivel control for reciprocating and rotating the LU 100 in the horizontal direction is performed as described above.

Figure 6:
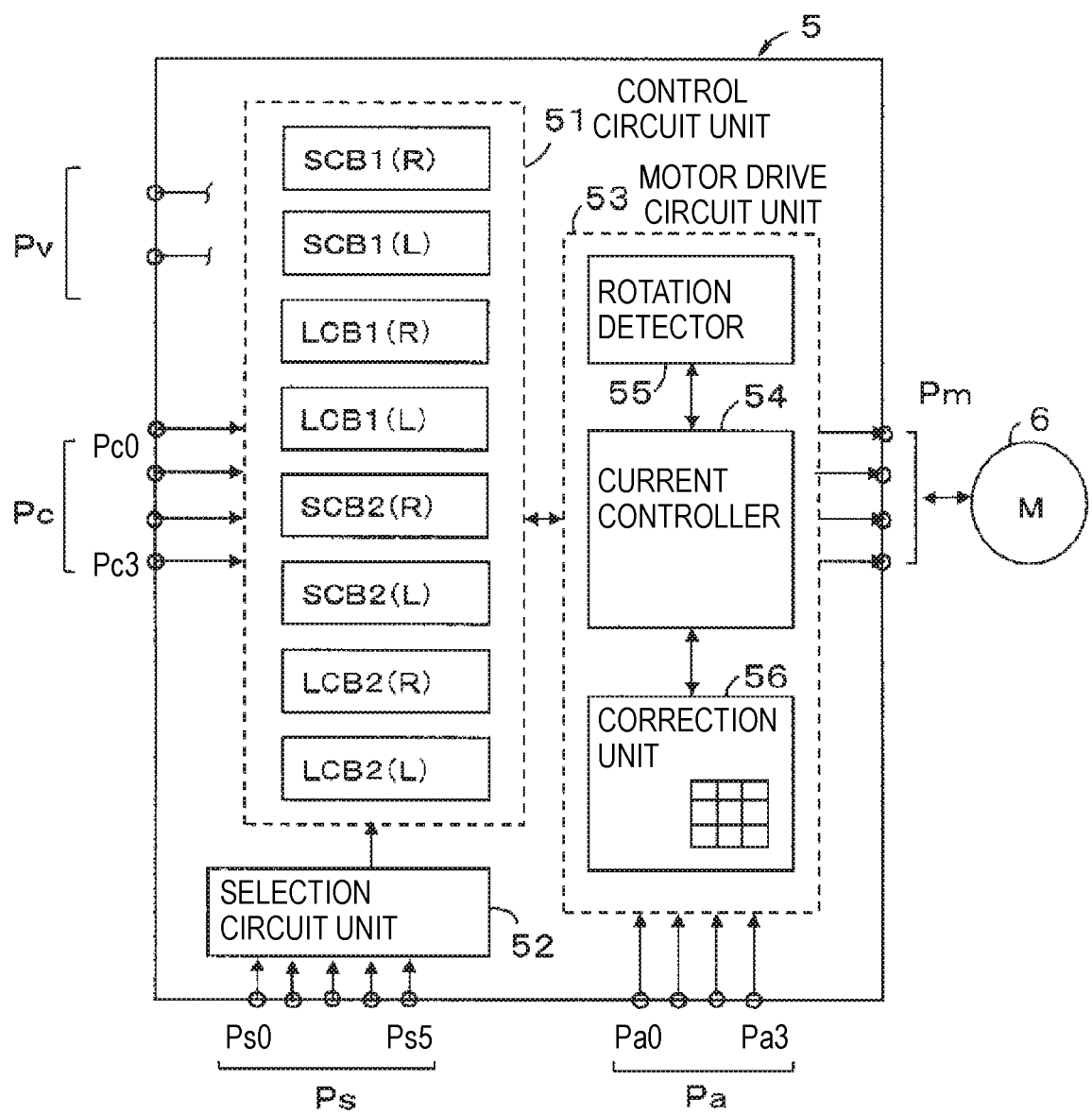
FIG. 6 a block diagram showing an internal configuration of a custom IC in accordance with one or more embodiments disclosed herein.

FIG. 6 shows an internal configuration of the custom IC 5. The custom IC 5 includes a power supply port Pv, a motor port Pm, a setting port Ps, a control port Pc, and a correction port Pa. The power supply port Pv is connected to the power supply IF unit 3, and the power controlled in the power supply IF unit 3 is input thereto. The motor port Pm is connected to the motor 6 and outputs a current for driving the motor 6. The rotation of the motor 6 is detected based on the output from the hole IC 65.

The setting port Ps includes six ports Ps5 to Ps0, that is, S/L (swivel/leveling) switching ports Ps5, Ps4, 1/2 (single function/two function) switching ports Ps3, Ps2, and R/L (right/left) switching ports Ps1, Ps0, and two ports form a pair. The control port Pc and the correction port Pa are each configured with four input ports Pc3 to Pc0 and Pa3 to Pa0. The setting port Ps, the control port Pc, and the correction port Pa are connected to the communication IF unit 4, and a setting signal, a control signal, and a correction signal from the vehicle ECU 200 are input to respective ports via the LIN 400 connected to the communication IF unit 4.

The custom IC 5 internally includes a control circuit unit 51, a selection circuit unit 52, and a motor drive circuit unit 53. The control circuit unit 51 includes a plurality of control circuits for performing preset control. By selecting one control circuit from these control circuits, the custom IC 5 is set as an IC for performing control over a function exhibited by the selected control circuit. Here, a control circuit having eight different functions is provided.

Of the eight control circuits, two control circuits are swivel control circuits SCB1 (R) and SCB1 (L) for the SA, and two control circuits are the leveling control circuits LCB1 (R) and LCB1 (L) for the LA. Other four control circuits are control circuits for the LSA. The other four control circuits are control circuits SCB2 (R) and SBC2 (L), and LCB2 (R) and LCB2 (L), in order to perform the swivel control and leveling control in the LSA separately.

"1" attached to each control circuit indicates a control circuit used for only one of swivel or leveling, that is, single function SA, LA, and "2" indicates a control circuit used for the LSA having both swivel and leveling functions. In addition, (R) and (L) indicate control circuits corresponding to the right head lamp and the left head lamp of the automobile, respectively.

For example, the SCB1 (R) performs calculation according to a predetermined algorithm based on a control signal input to the control port Pc, and outputs a motor control signal to the motor drive circuit unit 53. Accordingly, the motor drive circuit unit 53 controls the rotation of the motor 6 to rotate the output shaft 11 of the output mechanism unit 2, and, as shown in FIG. 2A, the swivel control over the LU 100, here, the LU disposed in the right head lamp, is performed. The SCB1 (L) similarly performs the swivel control over the LU 100 disposed in the left head lamp.

The LCB1 (R) similarly outputs a motor control signal to the motor drive circuit unit 53 based on the control signal input to the control port Pc. Accordingly, the motor 6 is controlled to rotate, and the output shaft 11 is linearly moved by the output mechanism unit 2, and as shown in FIG. 3A, the leveling control over the LU 100 disposed in the right headlamp is performed. The LCB1 (L) similarly performs the leveling control over the LU 100 disposed in the left head lamp.

The SCB2 (R) and the SCB2 (L) basically have the same configuration as the SCB1 (R) and the SCB1 (L), but the configuration of the output mechanism unit 2 of the LSA 10C is different from that of the SA 10A or the LA 10B. Therefore, the SCB2 (R) and the SCB2 (L) are configured to perform motor control according to their own output mechanism unit 2. In addition, the LCB2 (R) and the LCB2 (L) are also configured to correspond to the configuration of their own output mechanism unit 2.

Then, the SCB2 (R) and the SCB2 (L) rotationally control the motor 6S to rotate the output shaft 11 by the output mechanism unit 2. The LCB2 (R) and LCB2 (L) rotationally control the motor 6L to linearly move the output shaft 11 by the output mechanism unit 2. Accordingly, as shown in FIG. 4A, the leveling and swivel control over the LU 100 of each of the left and right headlamps is performed.

The selection circuit unit 52 selects any one of a plurality of control circuits in the control circuit unit 51 according to the setting signals respectively input to the setting port Ps, that is, the S/L switching ports Ps5, Ps4, the 1/2 switching ports Ps3, Ps2, and the R/L switching ports Ps1, Ps0. The selection circuit unit 52 decodes a binary signal input to each of the switching ports Ps5 to Ps0, and selects one control circuit by taking a logic of the decoded signal. The selected control circuit can control the motor 6 as described above based on the control signal input to the control port Pc.

The motor drive circuit unit 53 includes a current controller 54 which controls the current to be supplied to the motor 6, a rotation detector 55 which detects the rotation of the motor 6, and a correction unit 56 which corrects the rotation of the motor 6. The rotation detector 55 calculates rotation information such as a rotation position and rotation speed of the motor 6 based on a detection output of the hole IC 65 provided in the motor 6, and outputs the rotation information to the current controller 54.

The current controller 54 generates a control current to be supplied to the motor 6 based on a motor control signal output from the selected control circuit in the control circuit unit 51 and outputs the control current to the motor 6. At this time, feedback control is performed on a magnitude and timing of the current to be supplied based on the rotation information such as the rotation position and rotation speed of the motor 6 detected by the rotation detector 55.

The correction unit 56 corrects a rotation amount of the motor 6 in order to correct and normalize an inherent error existing in the output mechanism unit 2 of each actuator, particularly a difference in backlash (amount) generated in the gear train. That is, if there is a difference in backlash occurring in the output mechanism unit 2 provided to each actuator, when a rotation direction or movement direction of the LU 100 under the swivel control or leveling control is reversed, an error occurs in a control position of the LU 100 after the reversal due to the difference in backlash amount. Therefore, the backlash of the output mechanism unit 2 of each actuator is measured in advance, and the correction unit 56 is provided to correct the rotation of the motor 6 to eliminate the error of the measured backlash during actual swivel control or leveling control, so that high precision control is performed.

The details of the correction unit 56 will be described later. Based on the correction signal input to the correction ports Pa3 to Pa0, any one of a plurality of backlash correction values prepared in advance is set, and the set backlash correction value is output to the current controller 54. Based on the backlash correction value, the current controller 54 corrects the current to be supplied to the motor 6 based on the motor control signal from the control circuit. Accordingly, the inherent backlash differences in the respective actuators are eliminated.

The configuration of the LA 10B is almost the same as that of the SA 10A, so the illustration and description will be omitted. That is, the configuration of the control unit 1 is the same, including the custom IC 5 and the motor 6. The configuration of the LA 10B different from that of the SA 10A is the configuration of the output mechanism unit 2. The output mechanism unit 2 of the LA 10B is configured to linearly reciprocate and rotate the output shaft 11 by the rotation of the motor 6, so as to perform leveling control to reciprocate and rotate the LU 100 in the vertical direction.

The configuration of LSA 10C is basically the same as the SA 10A. The portions in the LSA 10C same as those in the SA 10A are not shown, but as shown in FIG. 4B, two custom ICs 5S, 5L and two motors 6S, 6L are mounted on the control board 13. The custom ICs 5S, 5L and the motors 6S, 6L have different reference numerals, but they have substantially the same configuration as the custom IC 5 and the motor 6, respectively.

The output mechanism unit 2 of the LSA 10C includes a gear train for rotationally driving the output shaft 11 by rotation of the motor 6S for the swivel control, and a gear train or screw mechanism for linearly moving the same output shaft 11 by rotation of the motor 6L for the leveling control. By rotating and linearly moving the output shaft 11 by the rotation of the motor 6S and the motor 6L, the swivel control for reciprocating and rotating the LU 100 in the horizontal direction and the leveling control for reciprocating and rotating the LU 100 in the vertical direction are performed.

The SA 10A, LA 10B, LSA 10C in the present invention have the above configurations. Next, the operation of the SA 10A will be described. In FIG. 2B, the BAT 300 and the LIN 400 are connected to SA 10A incorporated in the head lamp. Particularly, the vehicle ECU 200 is connected via the LIN 400. From the vehicle ECU 200, a setting signal, a control signal, and a correction signal corresponding to the SA 10A are input to the communication IF unit 3. In FIG. 6, the communication IF unit 3 inputs a setting signal as a binary signal to the setting port Ps of the custom IC 5, inputs a control signal as a binary signal to the control port Pc, and inputs a correction signal as a binary signal to the correction port Pa.

The selection circuit unit 52 selects any one of the eight control circuits described above based on the setting signals, that is 2-bit binary signals input to the S/L switching port Ps5, Ps4 and 2-bit binary signals input to the 1/2 switching port Ps3, Ps2, and 2-bit binary signals input to the R/L switching ports Ps1, Ps0. The binary signal is represented by "H" and "L" signals here. These "H" and "L" signals have, for example, a voltage of 5 V and 0 V (ground voltage), respectively. In the present invention, "H" is a first level and "L" is a second level.

In the selection of the control circuit in the control circuit unit 51, the selection is performed based on a table shown in FIG. 7. For example, when "H, L, L, H, H, L" are input as setting signals, the selection circuit unit 52 sets SCB* (*) as a selection candidate based on the binary signals "H, L" input to the S/L switching ports Ps5, Ps4, and squeezes SCB1 (*) based on the binary signals "L, H" input to the 1/2 switching ports Ps3, Ps2. Further, the selection circuit unit 52 finally selects SCB1 (R) based on the binary signals "H, L" input to the R/L switching ports Ps1, Ps0, and sets this SCB1 (R) to a state where control is to be performed by a control signal from the control port Pc.

The same applies to a case where the setting signal input to each switching port Ps has another array. When the setting signals do not correspond to the signal array shown in FIG. 7, the selection circuit unit 52 stops the selection in the control circuit unit 51 and simultaneously stops the communication with the communication IF unit 3. Accordingly, even when the control signal is input from the vehicle ECU 200, the swivel control or the leveling control by the actuator are stopped, the abnormal swivel control or the leveling control are prevented in advance, and the glare to an oncoming vehicle or the like is prevented. In this example, the swivel control by the SA 10A is stopped.

Simultaneously with the selection of the control circuit described above, a swivel control signal is input from the vehicle ECU 200 to the control port Pc as a control signal. The selected SCB1 (R) performs predetermined calculation based on the input swivel control signal, and outputs a motor control signal for performing swivel control corresponding to the swivel control signal. The swivel control signal is configured with 4-bit binary signals of "H" and "L" which are respectively input to the four control ports Pc3 to Pc0. The selected SCB1 (R) outputs the motor control signal based on this control signal. The swivel control signal may be a binary signal of 8 bits or other number of bits, and can be set to an arbitrary number of bits according to the control precision.

When receiving the motor control signal from the control circuit selected in control circuit unit 51, the motor drive circuit unit 53 generates a motor control current corresponding to the swivel control signal in the current controller 54, and controls the rotation of the motor 6 based on swivel control signal. A rotational force of the rotation shaft 63 of the motor 6 in the output mechanism unit 2 and transmitted to the output shaft 11. The rotation of the output shaft 11 controls the LU 100 to rotate to a swivel angle corresponding to the swivel control signal. During the swivel control, feedback control based on the rotation of the motor 6 detected by the rotation detector 55 is performed, but the detailed description of the feedback control is omitted here.

Although the above has described the SA of the right headlamp, the same applies to the left headlamp. The custom IC 5 selects SCB1 (L) based on the setting signal input to the setting port Ps. The selected SCB1 (L) controls the rotation of the motor 6 based on the swivel control signal input to the control port Pc, and the output mechanism unit 2 rotates the output shaft 11, so as to perform the swivel control.

In the LA 10B, the custom IC 5 also selects LCB1 (R) in the right head lamp based on the setting signal input to the selection port Ps, and selects LCB1 (L) in the left head lamp based on the setting signal. Then, the rotation of the motor 6 is controlled based on the leveling control signal from the vehicle ECU 200 input to the control port Pc, and the output shaft 11 is linearly moved in the output mechanism unit 2, so as to perform the leveling control.

In the LSA 10C, in the control unit 1, a setting signal input to each selected port Ps is input to each of the two custom ICs 5S, 5L. Based on this setting signal, SCB2 (*) is selected in the custom IC 5S connected to the motor 6S for swivel control, and LCB2 (*) is selected in the custom IC 5L connected to the motor 6L for leveling control.

Simultaneously, a leveling and swivel control signal from the vehicle ECU 200 is input to the control port Pc of each of the custom ICs 5S, 5L. Receiving the leveling and swivel control signal, the custom IC 5S drives the motor 6S based on a swivel control signal included in the leveling and swivel control signal in the selected SCB2 (*), so as to perform the swivel control. The custom IC 5L drives the motor 6L based on a leveling control signal included in the leveling and swivel control signal in the selected LCB2 (*), so as to perform the leveling control. The swivel control and the leveling control may be performed simultaneously or may be alternately performed over time. It is the same to perform these controls for the left and right head lamps.

The control circuits SCB1 (*) and SCB2 (*), that is, single function and two function swivel control circuits basically have the same functions as those described above, but the SA 10A and the LSA 10C are different in the configuration of the output mechanism unit 2. Therefore, since the control circuits SCB1 (*) and SCB2 (*) need to make the motor rotation control different even in the same leveling control, they are configured as independent control circuits. The same applies to the control circuits LCB1 (*) and LCB2 (*) which perform single function and two function leveling control, respectively.

As described above, the custom IC 5 of each actuator performs the motor control by the control circuit selected based on the setting signal, but an inherent difference occurs in the backlash of the gear train due to manufacturing variations or the like in the output mechanism unit 2 of each actuator. This is a cause of a control error in the swivel control or the leveling control. Therefore, the correction unit 56 of the motor drive circuit unit 53 sets a backlash correction value (hereinafter simply referred to as a correction value) based on a correction signal including a 4-bit binary signal input to the correction port Pa, and the current controller 54 corrects the current to be supplied to the motor 6 with reference to the correction value.

FIG. 8 is a table of the correction value set in the correction unit 56. Here, an array of 4-bit binary signals described in the right four examples of the table, that is, 4-bit "H" and "L" binary signals, is allocated to the backlash correction values described in the left column of the table. The backlash correction value is set to "5" as a reference value, and this value "5" is a standard average correction value when the backlash is corrected in the output mechanism unit 2 of the actuator.

When the backlash is smaller than the reference value, it corresponds to smaller values "4" to "2". On contrary, when the backlash is larger, it corresponds to larger values "6" to "9". These backlash correction values are arranged such that the correction amount of the rotation of the motor 6 has a normal distribution with the reference value "5" as a central value.

During correction, the backlash of the output mechanism unit 2 of each actuator is measured in advance, and a correction signal for correcting the backlash is output from the vehicle ECU 200 to the actuator and input to the custom IC 5. In the custom IC 5, the correction unit 56 recognizes a 4-bit binary correction signal input from the correction ports Pa3 to Pa0, and sets a correction value based on the recognized correction signal. For example, based on the setting table of FIG. 8, when the correction signal is "L, L, H, L", the correction unit 56 sets the correction value to "6" by referring to the setting table.

Receiving the setting of this correction value "6", the current controller 54 corrects the motor control current controlled based on the selected control circuit, for example, the motor control signal from SCB1 (R), in accordance with the correction value "6". Here, the correction is performed to increase the rotation amount of the motor 6. Accordingly, the swivel control is performed with high precision in which the inherent difference in backlash in the output mechanism unit 2 is eliminated.

In this way, the correction of the motor control signal by the correction unit 56 based on the correction signal input to the correction port Pa is the same in the leveling control in the LA 10B and the leveling and swivel control in the LSA 10C. Accordingly, the difference in backlash occurring in each of the output mechanism units 2 of the LA 10B and LSA 10C is corrected, and the leveling control and the leveling and swivel control with high precision are performed.

The four correction ports Pa are set to be at a high level (first level) when a "H" signal is input, and to be at a low level (second level) when an "L" signal is input. In addition, based on this setting, the correction port Pa is configured as a pull-down circuit. Therefore, for example, when one of the correction ports Pa is open due to a failure such as a disconnection of the LIN 400 or a connection failure at the correction port Pa, the signal level of the correction port turns into a low level, that is the second level, and it is impossible to distinguish it from the "L" signal.

When such a failure occurs, the correction unit 56 recognizes that the "L" signal is input even when the "H" signal is input to the correction port Pa, and an error may occur in setting of the correction value with reference to the setting table of FIG. 8. However, in this embodiment, by devising the array (allocation) of "H" and "L" of the correction signal with respect to the correction value in the setting table of FIG. 8, the setting error in the correction value and the decrease in precision of the swiveling and leveling control associated therewith can be minimized.

That is, assuming that the correction value setting table provided in the correction unit 56 is based on a simple hexadecimal array shown in FIG. 9, when the failure occurs in a single correction port, the correction values may be greatly different. This setting table uses "5" as a reference value, but in this setting table, for example, when setting signals "L, H, L, H" are input to set the correction value to "5", once a failure occurs in the correction port Pa2, the binary signal "H" of the corresponding bit changes to "L", and "L, L, L, H" are input. Accordingly, the correction value is set to "1" which is very far from "5", and the current controller 54 performs the motor control based on the correction value "1", remarkable decreasing the precision of the swivel control or the leveling control.

In contrast, in the setting table of the embodiment shown in FIG. 8, the correction value "5" is used as a reference value (default), and it is limited to a range of the four correction values "6" to "9" provided on the upper side and the three correction values "2" to "4" provided on the lower side. Then, a 4-bit signal "L, L, L, L" including four, the maximum number of "L", that is, the second level signal "L" is allocated to the reference value "5". Then, the correction values "4" and "6" sandwiching the reference value "5" are allocated with 4-bit signals "L, L, L, H" and "L, L, H, L" including three "L". Further, "3" and "7" on two sides of "4" and "6" are allocated with 4-bit signals "L, H, L, L" and "H, L, L, L" including three "L" different in bit array. That is, taking the reference value "5" as the center, a bit array in which the number of "L" of the second level signal is reduced in order as the correction value increases or decreases is obtained. In other words, a bit array in which the number of "L" increases sequentially toward the reference value is obtained.

In this way, by setting the correction values "3" to "7", the "H" setting signal is input to the correction port opened due to a failure, and even when "H" is changed to "L", the number of bits of "L" is increased. Therefore, the correction value is set in a direction approaching the reference value "5".

For example, when the correction signals "L, H, L, L" corresponding to the correction value "3" are input, the correction value "3" is held even when a failure occurs in the correction ports Pa3, Pa1 and Pa0. When a failure occurs in the correction port Pa2, since the signal of the port Pa2 becomes the second level signal "L", the correction signal becomes "L, L, L, L", which is set to the correction value "5". When the correction signals "L, L, L, H" corresponding to the correction value "4" are input, the correction value "4" is held even when a failure occurs in the correction ports Pa3, Pa2 and Pa1. When a failure occurs in the correction port Pa0, since the signal of the port Pa0 becomes the second level signal "L", the correction signal becomes "L, L, L, L", which is set to the correction value "5".

In addition, when the correction signals "H, L, L, L" corresponding to the correction value "7" are input, the correction value "7" is held even when a failure occurs in the correction ports Pa2, Pa1 and Pa0. When a failure occurs in the correction port Pa3, the correction signal becomes "L, L, L, L", which is set to the correction value "5". Similarly, when the correction signals "L, L, H, L" corresponding to the correction value "6" are input, the correction value "6" is held even when a failure occurs in the correction ports Pa3, Pa2 and Pa0. When a failure occurs in the correction port Pa1, the correction signal becomes "L, L, L, L", which is set to the correction value "5".

Therefore, in the case of these correction signals, the original correction value is maintained or set to the reference value "5" even when a failure occurs in the correction port, so that setting to a correction value very far from the reference value "5" can be prevented, and abnormal control in the swivel control and leveling control can be prevented in advance.

Meanwhile, a correction signal including 2-bit or 3-bit "H" is allocated to the correction signals "2", "8" and "9" relatively far from the correction value "5". Since the correction signal "L" never changes to "H" due to a failure at the correction port Pa, it can be said that the input "H" is a correct signal. In addition, since these correction signals "2", "8", and "9" are far from the reference value, a large error occurs in the correction value actually set even when the correction signal is not made close to the reference value. Further, since three bits are "H", even when one bit becomes "L", the influence on the correction value is small. Therefore, there is almost no abnormal control in the swivel control or leveling control.

For correction signals not corresponding to the correction values "2" to "9", for example, correction signals corresponding to the correction values "1" and "10" to "15" shown in the table of FIG. 9, it is considered that the possibility that these correction values are actually set is extremely small. If these correction values are set, it is also considered that another undesirable failure different from the port opening at the correction port occurs. Therefore, in this case, the correction value is forcibly set to the reference value "5". Therefore, since the correction of the motor control current with the reference value "5" is performed, the control of the significant error in the swivel control and the leveling control can be prevented.

In this way, in the actuator of the embodiment, when the correction port to which the correction signal for performing backlash correction is input in the custom IC is opened, the correction value is set to the reference value or a correction value close to the reference value. Therefore, the set correction value can be prevented from being greatly changed, and the control precision of the swivel control and the leveling control can be enhanced.

Although the above description has described an example of backlash correction values in the swivel control in the SA and the LSA, the same applies to backlash correction values in the leveling control in the LA and the LSA. In this case, even when the correction values are different between the swivel control and the leveling control, the central value of the normal distribution of the correction values or a value close to the central value may be set as the reference value.

In the embodiment, the correction port is configured by four input ports, and the setting signal is correspondingly configured by a 4-bit binary signal. However, the present invention is not limited to this number of bits. For example, in order to perform control with high precision, it may be configured by an 8-bit binary signal.

In the embodiment, the allocation for setting the backlash correction value based on the input signal input as the correction signal has been exemplified. However, the present invention can be applied to setting of various numerical values in the custom IC based on the input signal. Generally, the present invention can also be applied to the case of setting based on an input signal such as a case of taking a normal distribution with the central value as a reference value.

The present application appropriately incorporates the contents disclosed in the Japanese Patent Application (Japanese Patent Application No. 2017-088393) filed on Apr. 27, 2017.

The invention claimed is:

1. A control device, comprising:
a plurality of input ports, each of which receives a binary signal including an "H" level and an "L" level; and
a setting unit, which sets a numerical value related to control based on the binary signal input to each of the input ports,
wherein
each of the input ports is configured with a pull-down circuit so as to be at the "L" level when the input port opens, and
the setting unit associates different binary signal arrays with a plurality of the numerical values, respectively, and sets a binary signal array corresponding to a numerical value equivalent to a reference value among the plurality of numerical values as an array in which the number of the "L" level is the largest.

2. The control device according to claim 1, wherein a binary signal array corresponding to a numerical value close to the reference value is provided by reducing one binary signal in the "L" level.

3. A lamp light distribution control system comprising a control device configured to perform swivel control and/or leveling control over a vehicle lamp, wherein
the control device is the control device according to claim 1, and
the numerical value is a correction value when controlling rotation of a motor which performs the swivel control and/or the leveling control.

4. The lamp light distribution control system according to claim 3, wherein
the control device includes an integrated circuit,
the integrated circuit includes a control circuit unit which includes a control circuit configured to perform the swivel control and a control circuit configured to perform the leveling control based on a control signal, a motor drive circuit unit which controls the motor based on an output of each control circuit, and a selection circuit unit which selects the control circuit based on a setting signal, and
the motor drive circuit unit includes a correction unit which sets a correction value when controlling the motor based on a correction signal.

* * * * *